United States Patent [19]

Smith

[11] 3,876,619
[45] Apr. 8, 1975

[54] POLYEPOXIDES FROM DISULFONAMIDES,, PROCESS THEREFOR AND CURED PRODUCTS THEREFROM
[75] Inventor: Harry A. Smith
[73] Assignees: David P. Sheetz, both of Midland, Mich.; The Dow Chemical Company, Midland, Mich.
[22] Filed: May 23, 1973
[21] Appl. No.: 363,204

Related U.S. Application Data
[63] Continuation-in-part of Ser. No. 236,473, March 20, 1972, abandoned.

[52] U.S. Cl........... 260/49; 117/161 ZB; 260/47 EP; 260/63 HA; 260/79; 260/79.3 M; 260/830 P; 260/857 R
[51] Int. Cl............................................. C08g 20/36
[58] Field of Search......... 260/97 ED, 49, 2 ED, 79, 260/79.3 M, 830 P, 857 R

[56] References Cited
UNITED STATES PATENTS

| | | | |
|---|---|---|---|
| 2,643,244 | 6/1953 | Simons | 260/47 X |
| 2,671,771 | 3/1954 | Kenson | 260/47 |
| 3,014,895 | 12/1961 | Reynolds | 260/348.6 X |

Primary Examiner—Lester L. Lee
Attorney, Agent, or Firm—Benjamin G. Colley

[57] ABSTRACT

Novel polyepoxides are prepared from a disulfonamide such as diphenylether disulfonamide, epihalohydrin and sodium hydroxide with the use of 10 or more moles of epihalohydrin per mole of disulfonamide. These novel polyepoxides can be thermoset by heating either in the presence or absence of the usual catalysts or curing agents.

16 Claims, No Drawings

POLYEPOXIDES FROM DISULFONAMIDES, PROCESS THEREFOR AND CURED PRODUCTS THEREFROM

CROSS-REFERENCE TO RELATED APPLICATIONS

This application is a continuation-in-part of Ser. No. 236,473, filed on Mar. 20, 1972 and now abandoned.

BACKGROUND OF THE INVENTION

This invention relates to novel polyepoxides prepared from disulfonamides, a process for their preparation and cured products thereof.

It is known from the patent to Simons U.S. Pat. No. 2,643,244 that sulfonamides can be reacted with epichlorohydrin to produce thermoplastic resins having little or no residual epoxy groups and that these resins are useful to make coatings when modified with linseed oil acids and the like. In contrast to this, the present invention produces resins having an average of more than one epoxide group per molecule and are thermosettable with the usual catalysts or curing agents.

SUMMARY OF THE INVENTION

The novel polyepoxides of this invention are self-curable upon heating and can be cured with conventional epoxide curing agents. When conventional curing agents are employed, the polyepoxides of the present invention cure at a faster rate than do the epoxy resins of the polyglycidyl ether type.

The novel polyepoxides of the present invention have an average of more than one vic-epoxide group per molecule i.e. the sum of $m$ and $m'$ is always greater than about 1.5 and are represented by the general formulae:

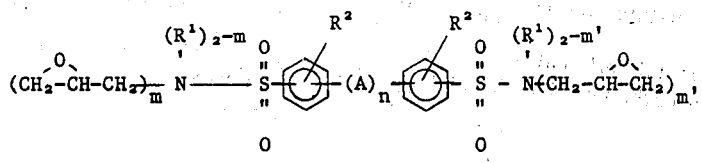

wherein A is a divalent hydrocarbon group having from 1 to about 6 carbon atoms,

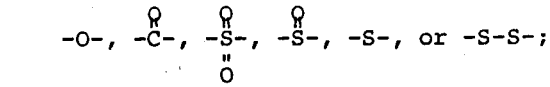

$n$ has a value of 0 or 1; or

II.

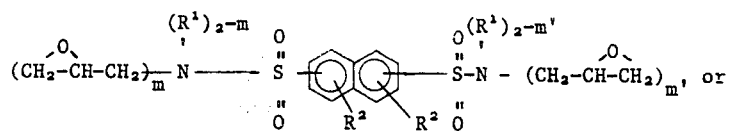

III.

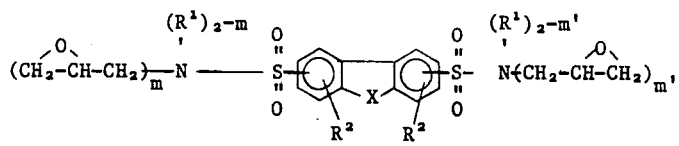

wherein X is oxygen or sulfur; or

IV.

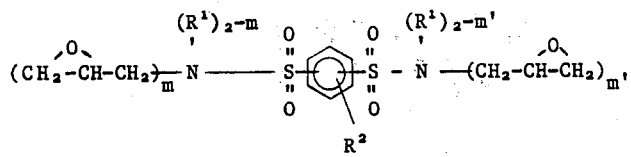

wherein in the above formulae I through IV each $R^1$ is independently hydrogen or the group $-CH_2-CHOH-CH_2-Z$ wherein Z is Cl, Br or I; each $R^2$ is independently hydrogen; an aliphatic hydrocarbon group having 1–6 carbon atoms; Cl; Br; or $-OR^3$ wherein $R^3$ is an acyl group having 1–6 carbon atoms, $m$ and $m'$ have values of from 0 to 2, with the proviso that the sum of $m$ and $m'$ is a value greater than about 1.5 and preferably a value between about 1.8 to about 2.3.

While the foregoing formulae are believed to be an accurate representation of the polyepoxides of this invention, there may also be a minor amount of dimers of an unknown structure present in the polyepoxides of this invention.

The novel polyepoxides of the present invention are useful as molding resins and coatings, useful to make reinforced plastics and potting compositions and the like.

DETAILED DESCRIPTION

The novel polyepoxides of the present invention are prepared by reacting a disulfonamide with an excess of an epihalohydrin at a temperature of from about 70°C. to reflux temperature (about 108°C.) preferably from about 95°C. to reflux for at least about 3 hours and preferably from about 4 to about 6 hours in the presence of a slight stoichiometric excess of an alkali or alkaline earth metal hydroxide or carbonate, alkaline earth metal oxides or mixture thereof, thereafter removing the excess epihalohydrin and recovering the desired polyepoxide.

An excess of an epihalohydrin, for the purposes of this invention, is defined as 10 or more moles per mole of the disulfonamide and preferably in the range of from 10:1 to 20:1.

Suitable disulfonamides which are employed to produce the novel polyepoxides of the present invention include those represented by the general formulae:

V.
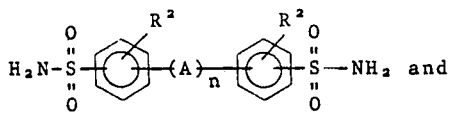
and

VI.
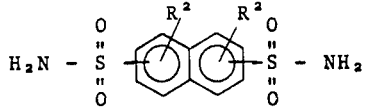

VII.
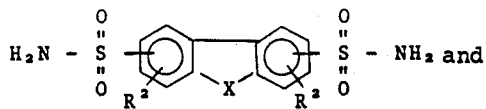
and

VIII.
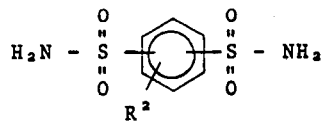

wherein A, R², X and $n$ are the same as in formulae I through IV.

Disulfonamides such as represented by the above formulae V through VIII include, for example, diphenylether-4,4'-disulfonamide, di(bromophenyl)ether-4,4'-disulfonamide, di(methylphenyl)ether-4,4'-disulfonamide, di(butylphenyl)ether-4,4'-disulfonamide, di(propylphenyl)ether-4,4'-disulfonamide, di(chlorophenyl)ether-4,4'-disulfonamide, naphthalene-1,5-disulfonamide, methyl-naphthalene-1,5-disulfonamide, dipropylnaphthalene-1,5-disulfonamide, chloronaphthalene-1,5-disulfonamide, bromonaphthalene-1,5-disulfonamide, dibromonaphthalene-1,5-disulfonamide, meta- and para-phenylene disulfonamide, dibenzofuran disulfonamide, dibenzothiophene disulfonamide, mixtures thereof, and the like.

Suitable epihalohydrins which are employed in the process of the present invention include epichlorohydrin, epibromohydrin, epiiodohydrin, mixtures thereof and the like.

Suitable alkali and alkaline earth metal hydroxides include sodium hydroxide, potassium hydroxide, calcium hydroxide, barium hydroxide, mixtures thereof and the like.

Suitable alkali and alkaline earth metal carbonates include sodium carbonate, potassium carbonate, barium carbonate, calcium carbonate, magnesium carbonate, mixtures thereof and the like.

Suitable alkaline earth metal oxides include barium oxide, calcium oxide, magnesium oxide, mixtures thereof and the like.

The excess epihalohydrin is conveniently removed by any of the well known methods such as for example, flashing at elevated temperature and reduced pressure, extraction with liquid aliphatic hydrocarbons, e.g., pentane or hexane, combinations thereof and the like.

The polyepoxide product is conveniently recovered by any of the well known methods of polymer recovery such as, for example, solvent extraction, with subsequent evaporation of the solvent, water washing, combinations thereof and the like.

The disulfonamide starting materials are conveniently prepared by chlorosulfonating the desired aromatic compound with at least a stoichiometric quantity of a suitable chlorosulfonation agent such as, for example, chlorosulfonic acid at a temperature of from about 50°C. to reflux for from about 2 to about 6 hours or longer. The resultant disulfonyl chloride after removal of any excess chlorosulfonation agent is then reacted with aqueous or anhydrous ammonia at reflux temperature for about 10 to about 24 hours. If desired, the disulfonyl chloride can be reacted with ammonia under autogeneous pressure at 100°C in about 1 to 2 hours. The resultant disulfonamide is then precipitated in cold water, filtered, and the product is finally recovered by slurrying the precipitate in hot water and again filtering.

The compositions of the present invention are believed to be mixtures of polyepoxides and in as much as the particular position of the sulfonamide groups or a substituent on the aromatic ring is not believed to be of any particular concern, no attempts have been made to determine such positions. What is important, is that the polyepoxides of the present invention have more than one epoxy group per molecule. However, the sulfonamide groups are usually in the 4,4'-positions when a diphenyl ether is employed and the 1,5-positions when a naphthalene is employed. The compositions may include amounts of other known polyepoxides, such as the diglycidyl ether of bisphenol A.

Suitable catalysts and curing agents which are employed to cure the polyepoxides of the present invention include the well known epoxy catalysts and curing agents such as primary, secondary and tertiary amines, polybasic acids and anhydrides, polyamides, Lewis acids, mixtures thereof and the like.

The type and quantity of catalyst and/or curing agent employed depends upon the physical properties desired of the cured product.

Inert fillers, fire retardant agents, accelerators, extenders and other modifiers may be added to the compositions of the present invention to modify the properties thereof.

The following examples are illustrative of the present invention and are not to be construed as to limiting the scope thereof in any manner.

EXAMPLE 1

To a reaction vessel equipped with a stirring means, temperature control means, refluxing means and vacuum means was added 32.8 grams (0.1 mole) of diphenylether-4,4'-disulfonamide, 92.5 g. (1.0 mole) of epichlorohydrin and 2.5 ml. of water. After raising the temperature to 95°C. with stirring, 8.8 g. (0.22 mole) of pelletized sodium hydroxide was added and the contents of the vessel was refluxed at 108°C. with stirring for 6 hours. The excess epichlorohydrin was removed by vacuum flashing at <50°C. and 1 mm. Hg. The product was then recovered by two extractions with 250 ml. each of warm acetone and subsequent removal of the acetone at 40°-50°C. and 10 mm. Hg. There was recovered 44 grams of colorless gummy polyepoxide having an epoxide equivalent weight (E.E.W.) of 218 and an epoxy functionality of 2.06 which was soluble in acetone and pyridine.

In order to illustrate the unexpected differences of this invention over the prior art i.e. the Simons patent, U.S. Pat. No. 2,643,244, Example 3 of this patent was repeated using diphenyl ether disulfonamide instead of N,N'-n-butyl diphenyl ether and the maximum ratio of epichlorohydrin to diphenyl ether disulfonamide (6:1) taught by Simons.

The results are tabulated and compared along with the results from Example 1 above in Table I.

Table I

| Reagents | Ex. 3 of 2,643,244 | Ex. 1 |
|---|---|---|
| diphenyl ether disulfonamide (DPEDSA) | 11.2 gms.(0.034 mole) | 32.8 gms. (0.1 mole) |
| epichlorohydrin (Epi) | 18.9 gms. (0.204 mole) | 92.5 gms. (1.0 mole) |
| NaOH | 8.2 gms. (0.205 mole)in 59 ml. H$_2$O | 8.8 gms.(0.22 mole in 2.5 ml. H$_2$O |
| Mole Ratios DPEDSA/Epi/NaOH | 1/6/6 | 1/10/2.2 |
| Reaction Temperature | 70°C. | 108°C. |
| Reaction Time | 20 minutes | 360 mins. |
| Products | white, infusible crosslinked solid unusable as a thermoset resin | colorless gum E.E.W. 218, epoxy functionality 2.06 epoxy groups/ molecule (functionality = M.W./E.E.W. |

EXAMPLE 2

In a procedure similar to Example 1, several resin preparations were made employing a mole ratio of disulfonamide/NaOH/epichlorohydrin of 1/2.2/10 employing various reaction temperatures and time. The conditions and times are given in the following Table II.

Table II

| Experiment No. | Reaction Temp. | Reaction Time (hrs.) | Yield | EEW of Product | Epoxy Functionality of Product |
|---|---|---|---|---|---|
| A | 108°C | 2.0 | >95% | 480 | 0.78 |
| B | 95°C | 2.75 | >95% | 420 | 0.90 |
| C (3 runs) | 95°C | 4.0 | >95% | 250–340 | 1.82–2.30 |
| D | 95°C | 5.0 | >95% | 376 | 1.80 |
| E | 108°C | 6.0 | >95% | 218 | 2.06 |

In the above Example 2, Experiments A and B were for comparative purposes while Experiments C, D and E were examples of the present invention.

EXAMPLE 3

2.5 Grams of the product of Example 1 was mixed with a stoichiometric quantity (0.2 grams) of diethylene triamine and cured at various temperatures. The results are given in Table III.

For comparative purposes, 500 grams of a diglycidyl ether of bisphenol A (DGEBA) having an EEW of about 189 was also cured with a stoichiometric quantity of diethylene triamine (DETA). The results are given in Table III.

Table III

| Resin | Cure Temperature | Gel Time Minutes | Cure Time (Time to Harden) |
|---|---|---|---|
| DGEBA/DETA | ambient (25°C) | 30–60 | 24–48 hours |
| DGEBA/DETA | 100°C | ND * | 1–2 hours |
| Ex. 1/DETA | ambient (25°C) | 3 | 25 minutes |
| Ex. 1/DETA | 100°C | 1.25 | 8–10 minutes |
| Ex. 1/DETA | 150°C | <1 | 1 minute |

* ND - not determined

The above example demonstrates that the polyepoxides of the present invention cure at a faster rate than the polyepoxides of the glycidyl ether of a bisphenol type.

EXAMPLE 4

A 2 gram portion of the polyepoxide prepared in Example 1 was heated at a temperature of 150°C in the absence of catalyst or hardener. The resin gelled within 45 minutes and was hard within 2½–3 hours.

We claim:

1. A polyepoxide represented by the formulae

I.

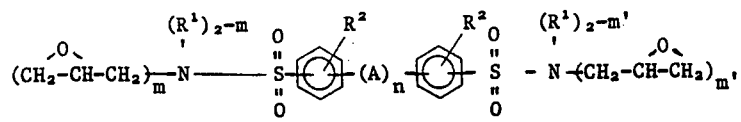

wherein A is a divalent hydrocarbon group having from 1 to about 6 carbon atoms, $$-O-,\ -\overset{O}{\underset{\|}{C}}-,\ -\overset{O}{\underset{\underset{\|}{O}}{\overset{\|}{S}}}-,\ -\overset{O}{\underset{\|}{S}}-,\ -S-,\ \text{or}$$

$n$ has a value of 0 or 1; or $$(CH_2-\overset{O}{\overset{\diagup\diagdown}{CH}}-CH_2)_{\overline{m}}N-\overset{(R^1)_{2-m}}{\underset{O}{\overset{O}{\underset{\|}{S}}}}-\underset{R^2\ R^2}{\bigcirc\!\!\!\!\bigcirc}-\overset{(R^1)_{2-m'}}{\underset{O}{\overset{O}{\underset{\|}{S}}}}-N(CH_2-\overset{O}{\overset{\diagup\diagdown}{CH}}-CH_2)_{\overline{m'}}\quad \text{II.}$$

$$(CH_2-\overset{O}{\overset{\diagup\diagdown}{CH}}-CH_2)_{\overline{m}}N-\overset{(R^1)_{2-m}}{\underset{O}{\overset{O}{\underset{\|}{S}}}}-\underset{R^2\ \ X\ R^2}{\bigcirc\!\!\!\!\bigcirc}-\overset{(R^1)_{2-m'}}{\underset{O}{\overset{O}{\underset{\|}{S}}}}-N(CH_2-\overset{O}{\overset{\diagup\diagdown}{CH}}-CH_2)_{\overline{m'}}\quad \text{III.}$$

wherein X is oxygen or sulfur; or $$(CH_2-\overset{O}{\overset{\diagup\diagdown}{CH}}-CH_2)_{\overline{m}}N-\overset{(R^1)_{2-m}}{\underset{O}{\overset{O}{\underset{\|}{S}}}}-\underset{R^2}{\bigcirc}-\overset{(R^1)_{2-m'}}{\underset{O}{\overset{O}{\underset{\|}{S}}}}-N(CH_2-\overset{O}{\overset{\diagup\diagdown}{CH}}-CH_2)_{\overline{m'}}\quad \text{IV.}$$

wherein in the above formulae I through IV each $R^1$ is independently hydrogen or the group $-CH_2-CHOH-CH_2-Z$ wherein Z is Cl, Br or I; each $R^2$ is independently hydrogen; an aliphatic hydrocarbon group having 1–6 carbon atoms; Cl; Br; or $-OR_3$ is an acyl group having 1–6 carbon atoms; $m$ and $m'$ have values of from 0 to 2, with the proviso that the sum of $m$ and $m'$ is a value greater than about 1.5.

2. A polyepoxide of claim 1 wherein the sum of $m$ and $m'$ has a value from about 1.8 to about 2.3.

3. A polyepoxide of claim 1 as represented by Formula I wherein $n$ has a value of 1.

4. A polyepoxide of claim 3 wherein A is $-O-$, and the sum of $m$ and $m'$ is about 2.

5. A process for preparing the polyepoxide composition of claim 1 wherein a disulfonamide selected from the formulae $$H_2N-\overset{O}{\underset{O}{\overset{\|}{S}}}-\overset{R^2}{\underset{}{\overset{}{\bigcirc}}}-(A)_n-\overset{R^2}{\underset{}{\overset{}{\bigcirc}}}-\overset{O}{\underset{O}{\overset{\|}{S}}}-NH_2 \quad \text{and}$$

$$H_2N-\overset{O}{\underset{O}{\overset{\|}{S}}}-\overset{R^2}{\underset{}{\overset{}{\bigcirc\!\!\!\!\bigcirc}}}-\overset{R^2}{\underset{}{\overset{}{}}}-\overset{O}{\underset{O}{\overset{\|}{S}}}-NH_2$$

$$H_2N-\overset{O}{\underset{O}{\overset{\|}{S}}}-\overset{}{\underset{R^2\ X\ R^2}{\bigcirc\!\!\!\!\bigcirc}}-\overset{O}{\underset{O}{\overset{\|}{S}}}-NH_2 \quad \text{or}$$

$$H_2N-\overset{O}{\underset{O}{\overset{\|}{S}}}-\underset{R^2}{\bigcirc}-\overset{O}{\underset{O}{\overset{\|}{S}}}-NH_2$$

wherein:

A is a divalent hydrocarbon group having from 1 to about 6 carbon atoms, $$-O-,\ -\overset{O}{\underset{\|}{C}}-,\ -\overset{O}{\underset{\underset{\|}{O}}{\overset{\|}{S}}}-,\ -\overset{O}{\underset{\|}{S}}-,\ -S-,\ \text{or}\ -S-S-;$$

$n$ has a value of 0 or 1; $R^2$ is independently hydrogen; an aliphatic hydrocarbon group having 1–6 carbon atoms; Cl; Br; or $-OR^3$ wherein $R^3$ is an acyl group having 1–6 carbon atoms; and X is oxygen or sulfur;

is reacted with a stoichiometric excess of an epihalohydrin at a temperature of from about 70°C. to reflux temperature for at least 3 hours in the presence of a slight stoichiometric excess of an alkali or alkaline earth metal hydroxide or carbonate or alkaline earth metal oxide or mixture thereof and thereafter recovering the polyepoxide product.

6. The process of claim 5 wherein the time of reaction is from about 4 to about 6 hours at a temperature of from about 95°C. to reflux.

7. A thermosettable composition comprising a polyepoxide of claim 1 and a curing amount of a curing agent or a catalytic amount of a catalyst.

8. A thermosettable composition comprising a polyepoxide of claim 3 and a curing amount of a curing agent or a catalytic amount of a catalyst.

9. A thermosettable composition comprising a polyepoxide of claim 4 and a curing amount of a curing agent or a catalytic amount of a catalyst.

10. The product resulting from heating the composition of claim 7.

11. The product resulting from heating the composition of claim 8.

12. The product resulting from heating the composition of claim 9.

13. The product resulting from heating a composition comprising a polyepoxide of claim 1 as the sole source of vic-epoxy groups.

14. The product resulting from heating a composition comprising a polyepoxide of claim 3 as the sole source of vic-epoxy groups.

15. The product resulting from heating a composition comprising a polyepoxide of claim 4 as the sole source of vic-epoxy groups.

16. The process of claim 5 wherein the disulfonamide is reacted with a 10 to 20 molar excess of an epihalohydrin.

* * * * *

UNITED STATES PATENT OFFICE
CERTIFICATE OF CORRECTION

PATENT NO. : 3,876,619
DATED : April 8, 1975
INVENTOR(S) : Harry A. Smith, David P. Sheetz It is certified that error appears in the above-identified patent and that said Letters Patent are hereby corrected as shown below:

On first page please correct the assignee section, the inventor David P. Sheetz, should be on the Inventor line.

Col. 7, line 6, please add -- -S-S-; -- before the phrase "n has a value of 0 or 1; or."

Col. 7, line 31, please delete in the formula --13--.

Col. 7, line 33, please add after OR₃ -- wherein $R^3$ --.

Signed and Sealed this seventeenth Day of February 1976

[SEAL]

Attest:

RUTH C. MASON
Attesting Officer

C. MARSHALL DANN
Commissioner of Patents and Trademarks